April 14, 1959 W. A. ROTE 2,882,352

D. C. AMPLIFIER SYSTEM

Filed Nov. 19, 1954

INVENTOR.
WILLIAM A. ROTE

BY Robert S. Toperzer
Attorney 2,882,352
Patented Apr. 14, 1959

2,882,352

D.C. AMPLIFIER SYSTEM

William A. Rote, Needham, Mass., assignor, by mesne assignments, to Minneapolis-Honeywell Regulator Company, a corporation of Delaware Application November 19, 1954, Serial No. 470,097
5 Claims. (Cl. 179—171)

Figures 1, 2:
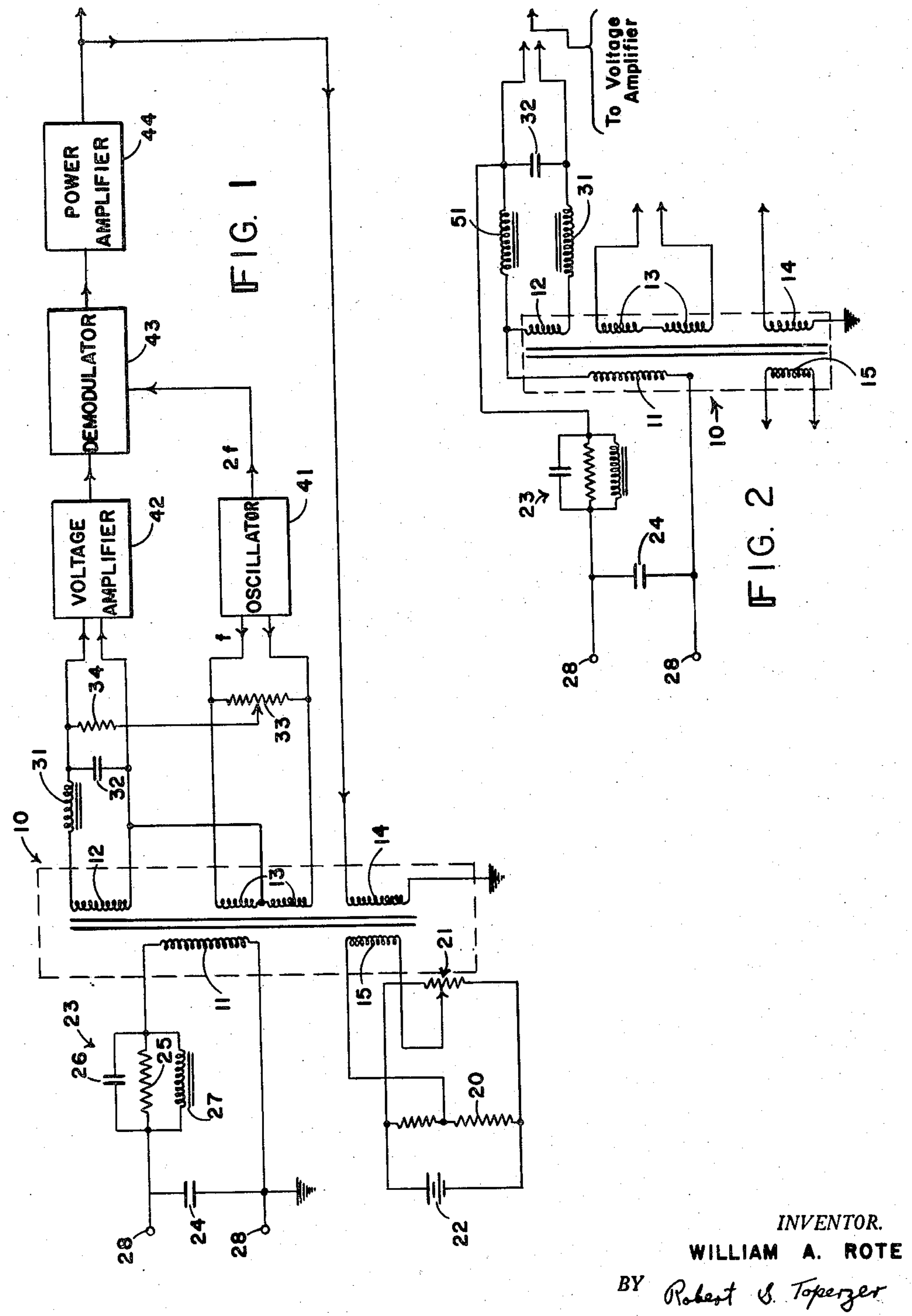

This invention relates to the amplification of low level signals and particularly to direct current amplifier systems incorporating saturable core devices.

Although most magnetic amplifier circuits are designed with a view toward deriving a signal of fundamental frequency from a saturable core device, that is, deriving an output signal having the same frequency as the excitation current for the saturable core device, in some applications certain advantages obtain from producing an output signal comprised mainly of a second harmonic voltage and operating only on this voltage. Circuits of the latter type are referred to broadly as second harmonic converters and are particularly well suited for amplifying small direct current (D.C.) signals or alternating current (A.C.) signals of relatively low frequency. These circuits are all based on the principle that with a saturable core transformer having a hysteresis loop which is asymmetrical about its origin, even order harmonic components are produced in the output winding. If the hysteresis loop of the transformer's core is symmetrical about its origin, however, no even order harmonic components will be present. To make use of this principle two identical cores having symmetrical hysteresis loops are employed in a conventional second harmonic converter, each core being provided with an excitation winding, a signal input winding, and an output winding. The excitation windings are connected in series but wound oppositely whereas each of the input and output windings is wound the same way. In fact, the cores are often arrangd to link a single input winding and a single output winding. When no signal is applied to the input winding, the magnetic fields produced by alternating current in the excitation windings being substantially equal and opposite, substantially no voltage is induced in the output winding. When a direct current is caused to flow through the input winding, on the other hand, as by impressing a D.C. signal thereon, there will be superimposed on the alternating magnetic fields in the cores a direct magnetic field, which has the effect of displacing the hysteresis loops of the cores making them asymmetrical with respect to the zero current axis. Accordingly, even harmonic voltage components will be caused to appear in the output winding, the fundamental and odd harmonic components being suppressed under perfect balance conditions, as in the case where no input signal is present. Since the second harmonic component is much the strongest of the even harmonics, it is then selected as the output signal.

The advantages of utilizing this device for amplifying low level D.C. signals lie partly in the device itself and partly in the inherent failing of more conventional electronic D.C. voltage amplifiers to maintain a stable zero setting. That is to say with respect to the device itself, the amplitude of the second harmonic signal produced in the output winding is a substantially linear function of the D.C. signal input voltage, this function being affected only by changes in the maximum flux density (B max) characteristics of the cores. Since core materials which have a highly stable B max are currently available, the amplitude relation between the input and output signals, namely the gain of the converter, remains relatively fixed as is of course most desirable. In contrast to electronic D.C. voltage amplifiers, the zero stability of the harmonic converter is excellent. This is because a second harmonic output signal can be produced only when the converter operates as a non-linear element whose impedance curve, characterized by the hysteresis loop of the core, is asymmetrical. Previously mentioned core materials having a stable B max also have a highly symmetrical hysteresis loop which in effect becomes asymmetrical only when a direct magnetic field is present along with the alternating excitation field. Therefore, by first converting the low level D.C. voltage to an A.C. output voltage of second harmonic frequency, one may further amplify the A.C. voltage in a conventional A.C. electronic amplifier having zero stability qualities comparable to those of the converter to obtain a signal of desired amplitude which represents the D.C. signal. Furthermore, it is a relatively simple matter to rectify the A.C. signal from the amplifier by means of a phase sensitive demodulator, so as to reproduce the D.C. input signal in its original form. Since the phase of the second harmonic output signal from the converter reverses with a reversal of the polarity of the D.C. input signal, the phase sensitive demodulator insures that the polarities of the D.C. input and output signals are the same.

According to this invention, a D.C. amplifier system is provided which incorporates a second harmonic converter in the general manner just described. Over and above the various advantages which accrue from the use of the converter alone, however, certain novel circuitry has been provided in order to greatly enhance the operational qualities of the system, without adding appreciably to its complexity. More particularly, it is an object of this invention to provide an improved second harmonic converter D.C. amplifier system having a more linear response characteristic, a greater amount of gain and bandwidth, all of this while still retaining the inherent desirable qualities of the converter itself, namely its high zero stability, reliability, and relative simplicity. The novel features of the system which accomplish these results together with further objects and advantages thereof will become more readily apparent when considered in connection with the accompanying drawing wherein:

Fig. 1 is a diagram of the amplifier system according to this invention partially in schematic form and partially in block form; and Fig. 2 is a schematic diagram of a modification of the input and output circuits associated with the harmonic converter of the amplifier system of Fig. 1.

Referring now to Fig. 1, it will be observed that a second harmonic converter 10 is provided, which has besides its input winding 11, its output winding 12 and its excitation windings 13, a feedback winding 14 and a zeroing winding 15. Zeroing winding 15 is connected between the midpoint of a resistor 20 and the movable arm of a potentiometer 21 each of which are coupled to a source of direct current illustrated as a battery 22. It will be appreciated however that the most convenient D.C. source is the power supply for the system not shown. Connected to input winding 11 is an input circuit including a parallel tuned filter 23 resonant at the second harmonic frequency, and a capacitor 24. Filter 23, which is comprised of a resistor 25, a capacitor 26 and an inductor 27, is connected in series with winding 11, and capacitor 24 is connected across the series combination of the winding 11 and filter 23. A pair of terminals 28 coupled to capacitor 24 comprise the input terminals to the system.

In order to excite the converter with alternating current of fundamental frequency there is provided an oscillator 41, illustrated in block form, having its fundamental frequency output circuit connected across excitation windings 13. On the one hand, the frequency of the excitation current should be relatively low in order to minimize the losses in the converter and to avoid resonance phenomena resulting from the inductance and stray capacitance of the converter windings. On the other hand, a high excitation frequency increases the gain and bandwidth of the system, at the same time reducing the noise. Taking both of the above criteria into account, a fundamental frequency in the neighborhood of from 1,000 to 1,500 cycles per second has been found desirable.

Coupled to output winding 12 is a single section inductor input filter which in turn is coupled to an A.C. voltage amplifier 42, the former comprising an inductor 31 and a capacitor 32. The series combination of inductor 31 and capacitor 32 is tuned to resonate at the second harmonic frequency so that substantially only the second harmonic component of the signal induced in winding 12 is transmitted to amplifier 42. To further insure that the signal applied to amplifier 41 is substantially only a second harmonic frequency signal and that any fundamental frequency components which may be induced in winding 12 do not reach amplifier 42, a fundamental frequency bucking control circuit is provided, comprising a potentiometer 33 and a resistor 34. Potentiometer 33 is connected in parallel with excitation windings 13, with its movable arm connected to an input lead of amplifier 42 through resistor 34. As will be apparent to those skilled in the art, by suitable adjustment of potentiometer 33 a voltage of fundamental frequency may be impressed across resistor 34 which is just equal in amplitude to any residue fundamental frequency component passing through the inductor input filter but opposite in phase. Hence the two fundamental frequency components will in effect cancel each other.

After the second harmonic voltage is amplified by amplifier 42 it is then detected by a demodulator 43 which is also supplied with a second harmonic reference signal from oscillator 41. Demodulator 43 is of the phase sensitive type so that when the phase of the second harmonic signal from amplifier 42 reverses relative to the phase of the reference signal, manifesting a change in the polarity of the D.C. input signal, the D.C. output signal from the demodulator will also reverse. Various demodulator circuits which perform in this manner are well known to those skilled in the art. Oscillator 41 may be adapted to provide a second harmonic reference signal as well as the excitation voltage in any number of ways. One convenient way, for example, is to utilize a push pull type oscillator, and to derive a second harmonic component of the oscillator output from its cathode resistor. A buffer amplifier connected across the cathode resistor may be provided for this latter purpose.

Although the portion of the amplifier system which has been described thus far operates satisfactorily as a D.C. voltage amplifier, for the reason that a relatively high power output signal is often required as in pen and ink recording and servo applications, for example, and for reasons to be discussed hereinafter, a power amplifier 44 is coupled to demodulator 43. Power amplifier 44 is necessarily of the D.C. type, but it does not detract appreciably from the overall zero stability of the system since it need not be designed to provide additional voltage gain. Hence amplifier 44 may comprise for example, one or more highly stable cathode follower amplifier stages whose sole function is to provide an output signal having sufficient power to drive whatever apparatus the system is to be used with, and at the same time supply power to feedback winding 14. The latter function is extremely important, since, as will become apparent, the linearity of the system and its bandwidth are greatly improved thereby.

In operation, an input signal which should be understood to include low frequency A.C. signals as well as D.C. signals, or a combination of both, is impressed effectively across input winding 11 when applied to terminals 14, since filter 23 will present a very low impedance to the input signal. Any unwanted stray A.C. components of relatively high frequency will be short circuited by capacitor 24, however, and thereby prevented from reaching the input winding 11. The combination of the input signal in winding 11 and the excitation current supplied to windings 13 by oscillator 41 produces in output winding 12 a signal comprised mainly of a second harmonic component, as previously outlined. This signal is filtered for second harmonic and then applied to amplifier 42. After being amplified sufficiently, the second harmonic signal is detected by demodulator 43 and once again amplified by D.C. power amplifier 44. Hence there will be present in the output of amplifier 44 a relatively high power signal representative of the input signal in both amplitude and polarity (or phase).

In order to greatly increase the linearity and also the bandwith of the system so as to make it responsive to input signal frequency components as high as one hundred cycles as well as straight D.C. signals, a large portion of the output signal is returned to feedback winding 14. Feedback winding 14 is arranged to produce a magnetic field which opposes the field produced by signal winding 11 thereby reducing the gain of the system but permitting the above advantages to be realized. According to this invention, the loss of gain occasioned by feedback winding 14 is not so significant as in hitherto known devices because of the novel input circuit associated with input winding 11. By means of this input circuit, second harmonic components induced in input winding 11 are prevented from reaching the input signal source which ordinarily has a low impedance and would otherwise act as a short circuit to output winding 12 as well as input winding 11. The need for preventing such operation is well known. However, in addition to this, fundamental frequency components are permitted to circulate in the input circuit by virtue of the fact that the impedance of filter 23 will be relatively low at this frequency. Since complete balance of the cores of the converter is never attained in practice, an appreciable amount of fundamental frequency current will therefore flow through winding 11 and the input signal source or alternatively capacitor 24. In this way, I have found that the gain of the converter itself is greatly increased, thereby increasing the gain of the overall system. Consequently, as much feedback may be used as is desirable from the standpoint of linearity and bandwith without the need for a large amount of amplification subsequent to the converter. Also, the sensitivity of the system as a whole is correspondingly enhanced.

Referring now to Fig. 2 there is illustrated a modification of the input and output circuits associated with windings 11 and 12, respectively, wherein an inductor 51 is employed in addition to filter 23 and the inductor input filter. Inductor 51 is connected in series between filter 23 and winding 11 and at the same time is connected between one leg of winding 12 and capacitor 32 as shown. By means of this arrangement, a small amount of the output signal is introduced in the input circuit in order to cancel second harmonic components induced in winding 11 directly. I have found this arrangement to provide even more bandwidth than that of Fig. 1 but having the disadvantage of somewhat reduced gain. Where bandwidth of the amplifier is the most important consideration, however, the arrangement of Fig. 2 is preferred.

It will be apparent to those skilled in the art that my invention is susceptible of various modifications within the spirit and scope of the appended claims.

Therefore, I claim:

1. In a second harmonic converter having a saturable core an excitation winding wound on said core coupled to a source of alternating current of fundamental frequency, a signal input winding on said core, and an output winding on said core wherein a voltage of second harmonic frequency is induced when a signal is impressed on said input winding to unbalance the flux in said winding, the combination with said input winding of an input circuit including a filter connected in series relation with said input winding, said filter presenting a high impedance to alternating current of said second harmonic frequency and a relatively low impedance to alternating current of said fundamental frequency, thereby to impede the flow of alternating current of second harmonic frequency in said input winding and to permit the flow of alternating current of fundamental frequency therein, and means directly connecting said source of alternating current of fundamental frequency to said output winding to cancel any signal induced in said output winding by said excitation winding.

2. The combination according to claim 1 wherein said input circuit includes a substantially capacitive element connected in parallel relation with the series combination of said input winding and said filter, said capacitive element having a sufficiently low impedance at the fundamental frequency to permit alternating current of fundamental frequency to circulate relatively freely in said input circuit.

3. The combination according to claim 2 wherein said filter is parallel tuned, its resonant frequency being equal to the second harmonic frequency.

4. In a second harmonic converter having a saturable core, an excitation winding wound on said core and coupled to a source of alternating current of fundamental frequency, an input signal winding on said core, and an output winding on said core wherein a second harmonic voltage is induced when a signal is impressed on said input winding; the combination with said input and output windings of input and output circuits, respectively, said input circuit including a parallel resonant filter connected in series with said input winding and resonant at the second harmonic frequency, and a capacitor connected in parallel with the series combination of said input winding and said resonant filter; said output circuit including a filter coupled to said output winding for selective transmission of signals of second harmonic frequency, and a connection from said source of alternating current to said output winding to balance any fundamental frequency signal on said output winding induced therein by said excitation winding.

5. The combination according to claim 4 including an inductor coupled between the filter associated with said input circuit and said input winding, and between the filter associated with said output circuit and said output winding.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,438,217 | Johnson | Mar. 23, 1948 |

OTHER REFERENCES

Geyger: "Magnetic Amplifier Circuits," chapter 16, "Second-Harmonic-Type Magnetic-Amplifier Circuits," pp. 219–232, McGraw-Hill Book Co., Inc. (publ.); publ. date January 29, 1954.